Sept. 10, 1940.  C. J. HERTLEIN  2,214,166
DIVIDING HEAD
Filed Sept. 29, 1937  3 Sheets-Sheet 1
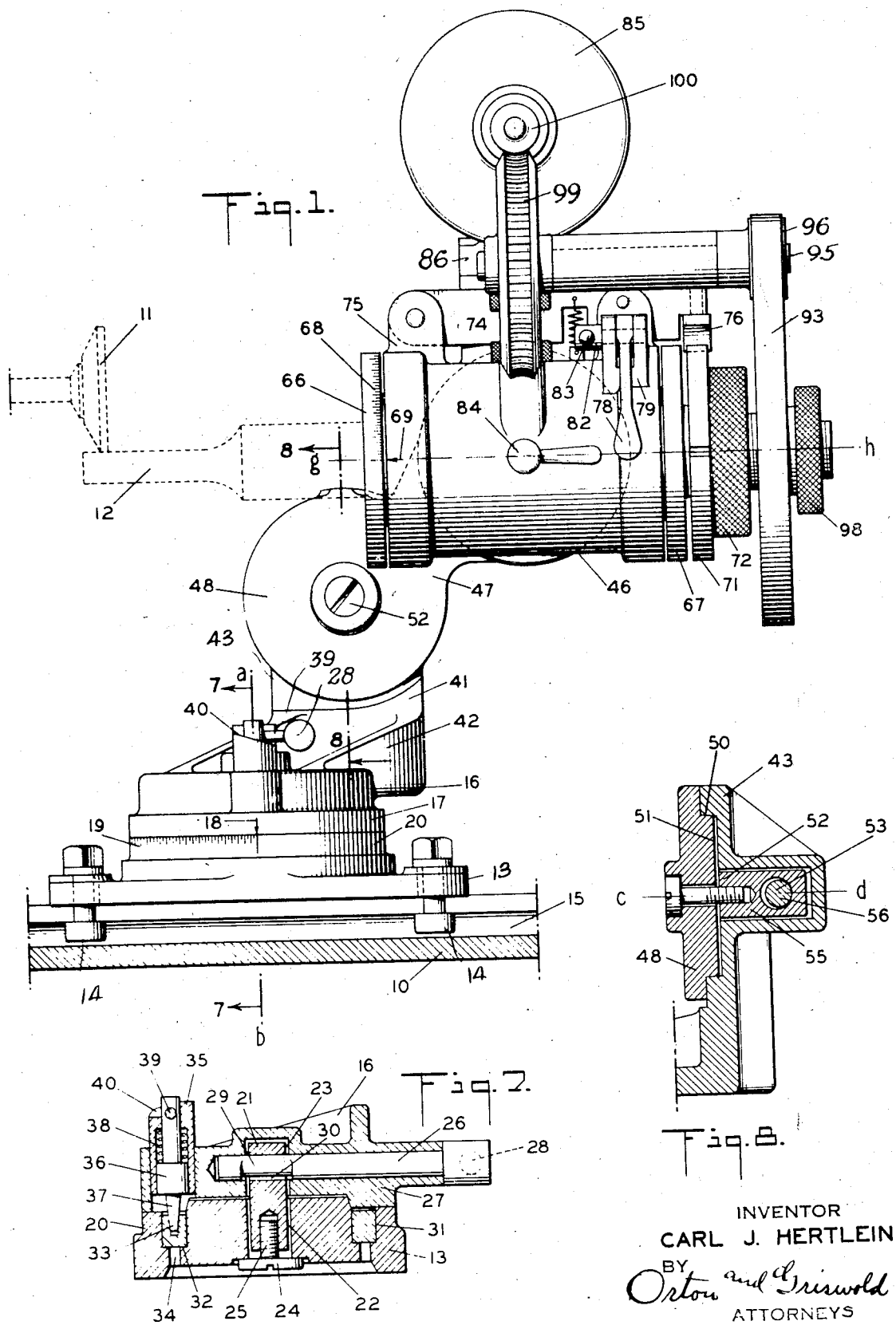
INVENTOR
CARL J. HERTLEIN
BY Orton and Griswold
ATTORNEYS

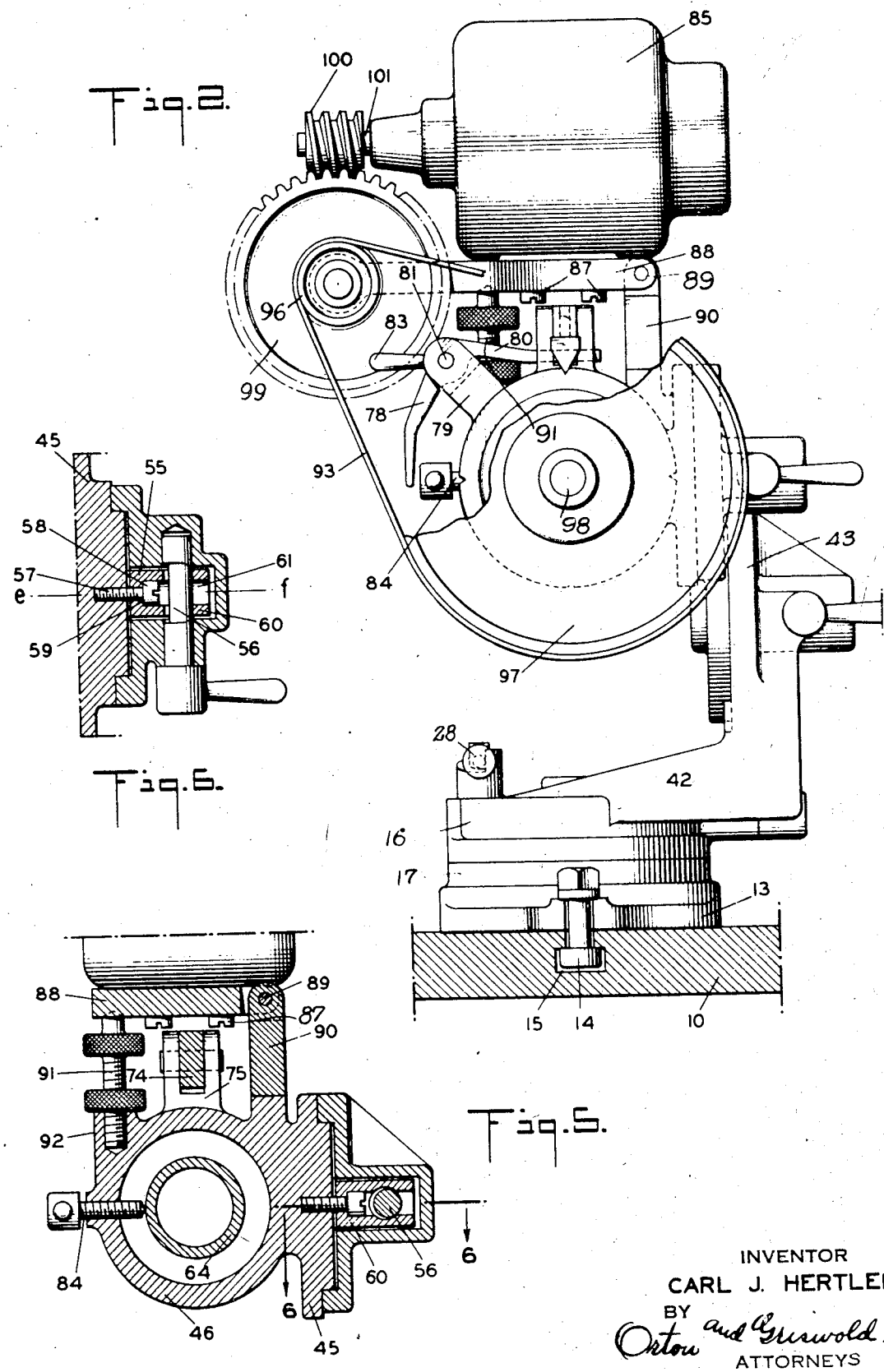

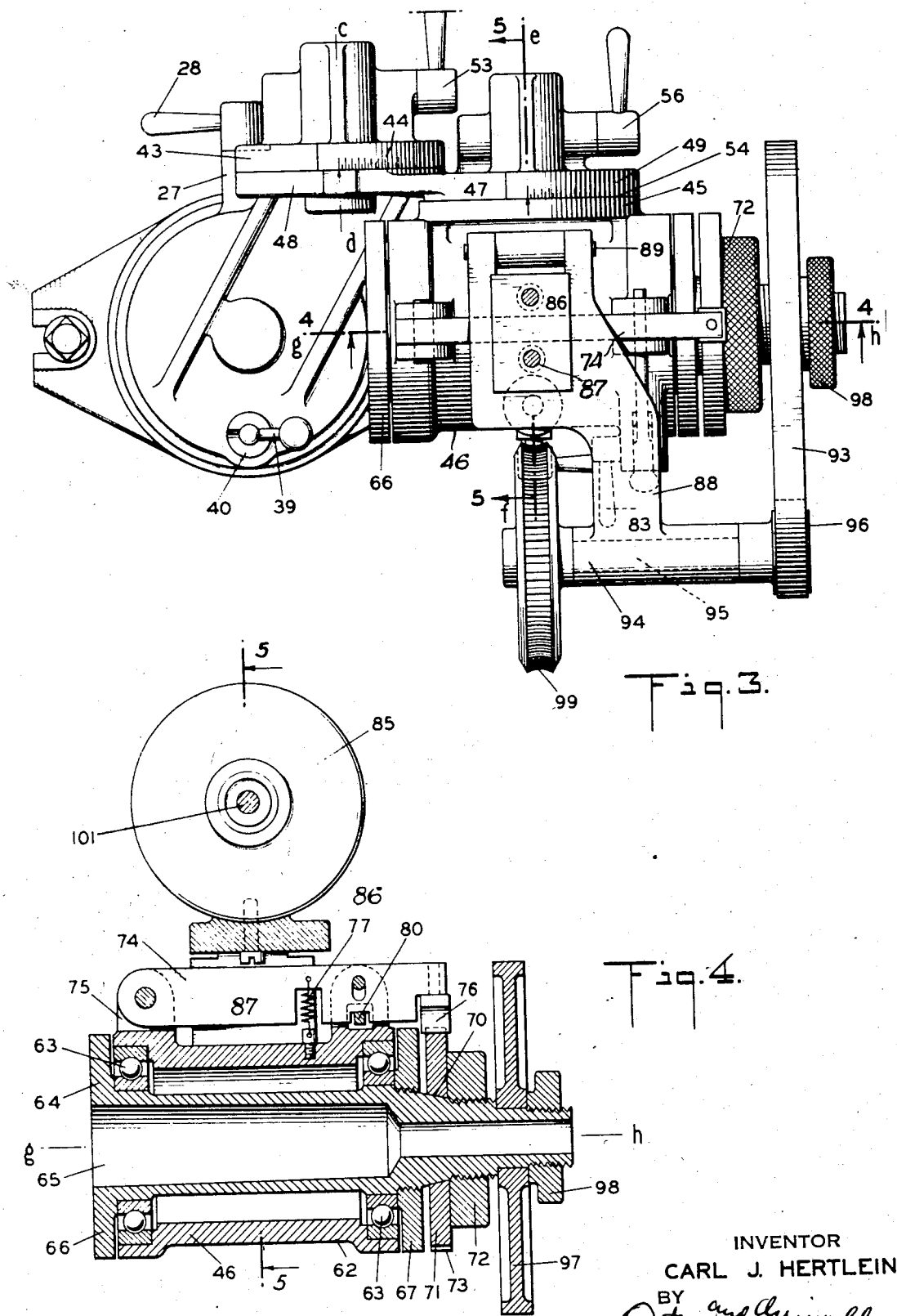

Patented Sept. 10, 1940

2,214,166

UNITED STATES PATENT OFFICE 2,214,166

DIVIDING HEAD

Carl J. Hertlein, Brooklyn, N. Y.

Application September 29, 1937, Serial No. 166,257

17 Claims. (Cl. 51—216)

The invention relates to an attachment for use with a grinding or other form of machine and constitutes a combined work supporting dividing head and work rotating organization for supporting the work to be ground or otherwise machined in operative relation to a grinding or other tool, and the invention constitutes a companion application with the "Grinding machine" and "Adjustable work bed" disclosed in applicant's copending applications Serial No. 103,838 and Serial No. 103,839 filed October 3, 1936, which have become Patent Numbers 2,118,304 and 2,141,751.

More specifically defined the invention relates to a work carrying spindle mounted for universal adjustment relative to a grinding or similar tool and which spindle and the work carried thereby can be accurately secured in any desired position in which it is adjusted and which attachment can be readily set so that it can be utilized as a dividing head as in those cases where flutes are to be ground on a piece of work, and which when the dividing head features are moved into inoperative position can be coupled to a power drive and thus rotated about its own axis to permit, for instance, grinding of a cylindrical part of the work.

The primary object of the invention is to provide an improved and simplified form of device of the type above outlined which will feature easily and conveniently manipulative means for securing the work accurately in its position to be operated upon; to provide for an increased range of adjustability over the work relative to the grinding tool over known types of similar devices as, for instance, to provide for three hundred sixty degrees and more of rotative adjustment of the head in which the work carrying spindle is journalled and at the same time to provide for a compact and easily accessible organization of component parts.

Another object of the invention is to provide for a selective manual and power rotation of the work with the source of power in close proximity to the work in all of its rotatively adjusted positions, utilizing a form of driving connection that will tend to minimize if not eliminate vibration either in the work or the part supporting the same.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the drawings:

Fig. 1 is a view in front elevation of a preferred embodiment of the invention shown in position with the indexing mechanism locking the work shown in dotted outline in connection with a grinding tool also shown in dotted outline and with the motor in non-driving relation disconnected from the work supporting spindle;

Fig. 2 is a view in side elevation looking at the device shown in Fig. 1 from the right hand side thereof and with a part of the spindle driving pulley broken away to show mechanism normally concealed thereby;

Fig. 3 is a plan view looking down upon the device shown in Figs. 1 and 2 with the motor removed from the bracket supporting the same;

Fig. 4 is a vertical transverse view taken axially through the work supporting spindle transversely through the motor bracket and taken on the line 4—4 of Fig. 3 looking in the direction indicated by the arrows;

Fig. 5 is a vertical sectional view through the head and motor bracket taken on the line 5—5 of Fig. 4 looking in the direction indicated by the arrows;

Fig. 6 is a detail view of an eccentric lock between the adapter and the head and taken in section on the line 6—6 of Fig. 5; and Figs. 7 and 8 are detailed vertical sectional views taken in parallel plane and respectively on the line 7—7 and 8—8 of Fig. 1.

The device herein disclosed is intended to be adjustably mounted as a whole on a support 10 herein shown to be the bed plate of a grinding or milling machine which includes a grinding tool 11 suitably driven from a power source independent of the power source herein illustrated for rotating the work 12 shown in dotted outlines in Fig. 1. The device includes a wide spreading base 13 secured to the bed plate 10 by means of bolts 14 having a headed portion engaging in slots 15 extending longitudinally of the grinding or milling machine. An angle bracket 16 is rotatably mounted on the base 13 for complete rotary movement, that is, for three hundred sixty degrees, or more, of rotative adjustment about a vertical axis a—b. The angle bracket base plate 17 is provided with an index pointer 18 which moves relative to a scale 19 formed on the rim 20 forming a reduced cylindrical upper portion of a base 13. In this way rotative adjustments of the bracket 16 as a whole about its vertical axis may be definitely set and quickly reset as desired.

The bracket may be locked in any rotative position to which it may be adjusted on the base by the locking means shown in Fig. 7. As therein shown a combined lifting rod and pivot pin 21 is mounted for vertical movement at the axis of rotation of the angle bracket on the base and is housed within vertically aligned bores 22 and 23. The rod 21 is provided at its lower end with a wide bearing head 24 vertically adjustable through screw threaded shank 25 and which head when the rod is in elevated position bears on the underface of the base 13. By such a centrally located locking device the locking can be effected in any position to which the bracket may be rotated and the central position of the rod tends to provide an internal bearing for the bracket on the base.

A manually actuated control rod 26 is journalled for rotary movement in a bearing 27 formed on the bracket 16 and is controlled by an exposed handle 28 conveniently located at the front of the attachment. Adjacent its inner end a portion of the rod 26 is cut away on one side to form an eccentric 29 engaging in a slot 30 in rod 21. It will be understood that by rotating handle 28 in one direction the control rod cams the lifting rod into elevated position to draw the head of the screw into firm engagement with the underside of the base and in this way lock the bracket to the base in any position in which the bracket may be rotated on the base.

There will be occasions where it is desired to quickly and repeatedly replace the bracket and parts carried thereby into one or more preset rotative positions. As these preset positions would ordinarily change in location with different types of work it is herein suggested that the machine include a replaceable notch ring arranged so that by a selection of one of a set of different notch rings the machine can be readily reset to provide the desired number and relative rotative positions in which the bracket is be set for any particular piece of work. For this purpose and again referring to Fig. 7 the upper face of the base 13 is provided with an annular groove 31 concentric with the axis a—b. Demountably positioned in this ring is one of a set of notch rings 32 provided on its upper surface with one or more circumferentially spaced apart notches 33. It is suggested in the illustrated embodiment of the invention that the notch rings have a friction tight fit in the groove 31 and may be demounted from the groove by means of some suitable tool inserted into the knock-out apertures 34 opening through the underside of the base 13. A plunger carrying cylinder 35 has a driven tight fit in an opening therefor formed in the base 13. Slidably mounted therein is a plunger 36 carrying at its lower end a conical pin 37, designed to fit in any one of the notches 33 as the bracket is rotated to bring the pin in line with the different notches in the replaceable ring. A spring 38 housed in the cylinder 35 normally acts on the plunger to depress the same and plunger stop pin 39 acts to limit the downward movement of the spring pressed plunger. Stop pin 39 constitutes a finger piece by means of which the plunger can be elevated into an inoperative position and held in such elevated position by engagement with an inclined cam top face 40 formed at the upper end of cylinder 35.

The angle bracket 16 includes an upstanding flange 41 braced from the base plate 17 by integrally connected gussets 42. The upper portion of the flange 41 is of circular conformation and forms an upstanding flat circular mounting disc 43, the upper cylindrical edge of which is provided with a graduated scale 44. This mounting disc 43 is designed to have mounted thereon the base 45 of a work spindle supporting head 46, or one end of the adopter 47 to which the base 45 may be mounted as suggested in Figs. 1 and 3. It is a preferable construction to mount the head 46 directly on the rugged angle bracket 16 so as to maintain the desired compactness of the several parts at close position relative to the supporting base but in the illustrated embodiment of the invention any such mounting of the head would limit the head in its rotation about its horizontal axis of turn as the head would in this case contact with the base plate 17 in any attempt to rotate the head into or close to any desired vertical position with the work 12 extending either upwardly or downwardly. However, in those cases where the work is intended to extend more or less horizontally, the adopter herein disclosed is omitted and the base 45 is connected directly to the mounting disc 43 as hereinafter described for the mounting of either the adopter to the mounting disc or the base 45 to the adopter as the connections are identical.

Referring to the adopter 47, it will be noted that it is formed in effect of two disc-like ends 48 and 49. As by reference to Fig. 8, the front side of the disc 43 is provided with a circular recess 50 in which is rotatably mounted circular hub 51 projecting rearwardly from the end 48 so that the adopter is mounted for adjustable rotary movement about the horizontal axis c—d. The adopter is secured in any of its rotative positions by means of locking mechanism 52 also shown in Fig. 8 operated from control rod 53 and corresponding in structural details to the adjustable locking means disclosed in Fig. 7. The other disc-like end 49 of the adopter is provided with a graduate scale 54 and otherwise corresponds in structural detail to the mounting disc 43 of Fig. 8 including locking means 55 actuatel by control rod 56 for securing the head to the adopter as particularly illustrated in Figs. 5 and 6. In this case the adjusting screw 57 is reversed in position from the arrangement of the corresponding pins shown in Figs. 7 and 8 in that its head 58 engages wall 59 in the lifting rod 60 and its shank is in adjustable threaded engagement with the base 45, access being provided to the head of the screw through bore 61. By adjusting the screw in either case any wear on the interengaging surfaces of the relatively rotatable members may be compensated and there is thus maintained a snug fit of one part on the other in all rotative positions. This construction provides for a freedom of rotary movement of the head 46 about a horizontal axis e—f extending parallel to and offset from the axis c—d.

The length of the adapter as a whole is so proportioned relative to the length of the head and preferably of the length of the head plus its associated parts, that the head can be rotated for three hundred sixty degrees and more about the axis e—f without interference from the bracket or any other structural part of the machine in the parts herein disclosed. For instance, it is possible to rotate the head 46 from the horizontal position shown in Fig. 1 into a vertically extending position with the work 12 depending vertically below the head 46. It is, of course, within the scope of the disclosure to substitute for the adopter illustrated a different size adopter, as, for instance, a longer adopter where circumstances require that the head be mounted at a still greater distance from the supporting bracket but in general it is preferable to keep the mass of the head and associated parts as close to the supporting base as possible, taking into consideration convenience of location between the grinding tool 11 and work 12.

Referring to Fig. 4 for details of the head and associated parts, it is noted that the head includes an open end cylindrical barrel 62 in opposite ends of which are mounted roller bearings 63 and within which roller bearings are positioned a long, hollow spindle 64, one end of which is provided with a tapered bore 65 in which the work 12 may be positioned with a driven fit as is usual in the mounting of such work in spindles. It is obviously within the scope of the disclosure to substitute a mandrel chuck or other form of work supporting part in place of the hollow spindle shown. For the purpose of facilitating easy replacement of the spindle illustrated for another form of work supporting part, means are provided to facilitate an easy demounting of the spindle. In the illustrated form the spindle is provided at one end with an outstanding flange 66 and at its other end a nut 67 is in screw threaded engagement with the projecting end of the spindle and the parts are so arranged that tightening up the nut will draw the flange at the opposite end into engagement with its adjacent roller bearing thus ensuring the positioning of the spindle in the head against accidental axial movement. Should it be desired to substitute a different form of work supporting instrument in place of the spindle illustrated, it is simply necessary to loosen nut 67, assuming the other parts illustrated are previously removed, and slip the spindle to the left and out of the head. It is understood that the replaced work support, whatever its form may be, is similarly provided with a flange at one end and a threaded portion to receive the nut 67.

The present disclosure features a construction of the head and associated spindle which can be utilized at will as a dividing head and as a power driven work rotating mechanism.

Considering its functioning as a dividing head, the flange 66 is provided with a graduated scale 68 coacting with an index pointer 69 on the adjacent end of the barrel 62 and by means of which the angle of rotation between the spindle and head may be definitely and accurately determined as is usual with such structures. Again referring to Fig. 4, just beyond the nut 67 the projecting end of the spindle 64 is shaped to provide a frusto-conical bearing 70 to which is fitted an index plate 71 demountably secured in place by nut 72 in threaded engagement with the spindle, midlength of its projecting end. This index plate is provided with one or more notches 73 accurately spaced apart the desired number of angular degrees for the indexing of the particular piece of work for the time being in the machine. It is a feature of this disclosure that this index plate may be readily replaced by similar index plates having a different number of notches and in general it will be understood that the machine is supplied with a set of such index plates with their notches arranged in multiples of five, ten, fifteen, or any other usual number of notches commonly used in the indexing of work for which the machine is designed.

A long bar 74 constitutes an index lever, is pivoted at one end to lugs 75 integral with the barrel and is provided at its free end with a knife edge 76 forming an index finger adapted to engage in one of the notches 73 as indicated in Fig. 2 to hold the spindle in fixed relation to the barrel. A spring 77 acting between lever 74 and the barrel tends to maintain the index finger 76 in engagement with the periphery of the index plate so that as the spindle is rotated manually towards its several indexed positions, the index finger will automatically engage in each notch as it is brought successively beneath the same as the barrel is rotated. The index finger 76 may be elevated into an inoperative position clear of the index plate by means of a bell crank lever 78 pivoted on lug 79 projecting from the head as particularly shown in Fig. 2, and having an arm 80 underlapping the lever 74 adjacent the free end, as shown in Fig. 4. The lug 79 is preferably in the form of a pair of bifurcated jaws (see dotted line structure in Fig. 3) which can be sprung into engagement clamping the lever 78 by forming its fulcrum pin 81 with a camming head 82 controlled by handle 83.

In those cases where it is desired to omit the use of the index finger mechanism thus described, the spindle may be locked in any position in which it may be rotated by means of a locking screw 84 (see Fig. 5) threaded through the side of the barrel and having its inner end engaging against the adjacent side of the spindle 64. When it is desired to drive the spindle by power, it is, of course, necessary to set both the indexing finger 76 and the locking screw 84 into inoperative, unlocked position.

It is a feature of this disclosure that the work 12 may be rotated about the axis $g$—$h$ of the spindle at slow speed from a standard form of relatively high speed electric motor through an appropriate form of reducing gear drive and belted connection between the motor and the spindle. The construction herein illustrated to meet this requirement also features a close disposition of the motor relative to the spindle which it drives and otherwise the construction is designed to minimize length of connecting parts between the source of power and the driven spindle so as to minimize vibration and to avoid any necessity of changing the driving connection with changes in the position of the parts supporting the spindle. An electric motor 85 is provided with a motor base 86 and otherwise the showing is intended to represent a standard form of electric motor now on the market.

The motor is secured by screws 87 to a bracket 88 (see Fig. 3) one end of which is pivotally mounted on pin 89 carried by upstanding post 90 projecting upwardly as shown in Figs. 2 and 5 from head 46. The bracket 88 rests intermediate its length on a screw compensating device 91 having its lower end threaded into boss 92 projecting upwardly from the head in parallel relation to the post 90. This compensating device is utilized to raise or lower the bracket 88 and parts supported thereon about the pin 89 as a center so as to adjust tension on the belt 93 hereinafter described. The outer free end of the bracket as viewed in Fig. 3 forms a long shaft bearing 94 in which is mounted a power transmission shaft 95 forming part of the reduced speed power drive between the motor and spindle. One end of the shaft is provided with a small pulley 96 which is connected by belt 93 with a spindle driving pulley 97 of relatively larger diameter, demountably secured to the reduced outer end of spindle 64 by means of nut 98. A relatively large worm wheel 99 is secured to the opposite end of the shaft 95 and is driven from a worm 100 secured directly to the motor shaft 101. From this construction it will be understood that assuming nut 98 to be in position tightening the pulley 97 to the spindle, then the spindle is at all times in direct driven connection with the electric motor in any and all positions in which the head may be adjusted.

By means of a device of the character outlined, it is appreciated that the attachment may be bodily adjusted on the bed 10 of the grinding machine so as to bring the attachment as a whole in approximately correct position relative to the grinding tool 11.

Then by manipulating control handle 28 at the base of the attachment, the angle bracket may be rotatably adjusted about the vertical axis $a-b$ and secured in position by the engagement of plunger 36 in one of its associated notches, or the angle bracket may be freely rotated into any desired position indicated on the scale 19 when the plunger is held in its elevated, inoperative position. By means of the eccentric lock shown in Fig. 7, the bracket 16 may be locked in any position in which it may be set.

With the angle bracket thus set in position, the spindle carrying head may be adjusted for rotation about the horizontal axis $c-d$ when the head is directly mounted on the mounting disc 43 of the bracket, or, about the axis $e-f$ when the adapter is used and the head secured to the mounting disc 49 of the adopter. When the adopter is used the head and associated parts carried thereby may be rotated into any position about the axis $e-f$ as it is the purpose of the adapter to offset the head so as to be clear of any part which it might otherwise engage. This is of particular advantage when it is desired to move the works from the horizontal dotted line position shown in Fig. 1 into a position in which the work extends vertically. The readily manipulative and conveniently located locking devices at 53 are utilized to lock the adopter in whatever position it is desired and the locking device 56 is utilized to lock the head into whatever position it may be rotated about its horizontal axis such as the axis $e-f$.

The work 12 to be ground is inserted in the tapered bore of the spindle either directly or with reducers. By means of screw 84 the spindle is secured from rotating in the head if such securing is desired to hold the work from accidental rotation. The nut 73 holding the index plate to the spindle may then be loosened, thus permitting the rotation of the index plate 73 relative to the spindle. Screw 84 is then loosened and the spindle may be turned relative to the loosened index plate for the time being held against rotation by index finger 76. It is suggested that by means forming no part of this disclosure the cutting edge of the work 12 to be ground is located above or below the center as the case may be to get the proper cutting or grinding clearance. Then screw 84 may be retightened to hold the spindle and nut 72 tightened to insure the proper location of the index plate. Then by loosening screw 84, the work 12 is ready to be ground. By so setting the work, there is obtained an accurate locating of the same above or below the center as the case may be without changing the work in the spindle. It is understood that by manipulating the lever 78 say at the end of one grinding operation longitudinally of the work, the engagement of the index finger with the index plate may be momentarily released. The spindle and work carried thereby can then be rotated over an angle set by the spacing apart of the notches in the index plate and releasing the lever 78 of the index finger is permitted to catch into the next succeeding notch and the work 12 is then in position for the succeeding longitudinal grinding thereon along a new line. This operation can be continued until all of the longitudinal grinding such as the flute grinding or cutting in those cases where the work 12 is a fluted tool has been accomplished about the entire surface of the work.

Should it then be desired to grind some cylindrical part of the work 12, the indexing mechanism is moved into an inoperative position and locked in such position by shifting the lever 85. Nut 98 is tightened to connect driving pulley 97 with the spindle 64 and the circuit closed through the motor.

For economic reasons it is preferable that the motor be of a high speed type and the necessary reduction in speed to drive the spindle at relatively low speed is attained through the reducing worm drive herein featured. With the work thus rotating at relatively slow speed, the grinding tool 11 is operated conventionally to effect a cylindrical grinding of the work as desired.

Should it be desired from time to time to vary the belt tension as needed, the screw forming part of the compensating device 91 is manipulated to raise or lower the bracket 88 and thus increase or diminish belt tension.

The disclosure features a construction of parts which can be readily demounted and replaced by other similar parts. It is noted for instance that the particular form of head and associated driving mechanism herein disclosed may be readily replaced by a similar form of head of say larger dimension and with its appropriate size motor and driving connection best suited for the different size work intended to be carried by the larger size head. Different size adapter plates may be employed selectively to accommodate such larger size heads and in general the disclosure features a construction in which worn or damaged parts can be readily replaced simply by removing the damaged or worn parts and without necessity of dismantling any material part of the remaining portion of the machine.

I claim:

1. In a device of the class described, the combination of a head, means for securing the head in an adjusted position, a work supporting spindle rotatably mounted in the head, indexing means between the spindle and head, means for securing the indexing means in an inoperative position to permit at will the rotation of the spindle in the head, locking means between the spindle and head, an electric motor carried by the head and a driving connection carried by the head for driving the spindle from the motor when the spindle is free to turn in the head, said driving connection including means for intercepting the driving of the spindle from the motor when it is desired to use the spindle and head with their associated indexing means.

2. A universal dividing head mounted for adjustable movement about a horizontal axis, a work carrying spindle mounted for rotary movement in the head, means for locking the spindle against rotary movement in the head, an index plate provided with notches accurately spaced apart a desired number of angular degrees secured to the spindle and rotatably adjusted thereon, an index lock carried by the head and engaging selectively in the notches in the index plate to secure the spindle in rotatively adjusted position, means for setting said index lock into an inoperative position to permit free rotary movement of the spindle when the spindle locking means is also in an inoperative position and means for driving the spindle including an electric motor, a driving pulley on the spindle and a belted connection between the electric motor and the pulley.

3. An attachment for a grinding or similar machine comprising a head supported for rotary adjustment about a horizontal axis, a work carrying spindle rotatable in the head and projecting therefrom, an index plate and a pulley both removably carried by and loose on the projecting portion of the spindle, means for securing the index plate and the pulley at will to the spindle, an index finger carried by the head for coaction with the index plate when it is desired to use the attachment as a dividing head, means for securing the index finger in inoperative position, a relatively high speed motor carried by the head and a speed reducing driving connection between the motor and the pulley for driving the spindle at relatively low speed when it is desired to use the attachment as a work rotating device.

4. A combined universal dividing head and work driving mechanism for grinding, milling and other machines comprising a base adapted for mounting on the machine, a head, means for mounting the head relative to the base in a plurality of positions about the axes at right angles to each other, a work supporting spindle rotatably mounted in the head and adapted to be rotated both manually and by power, means for locking the spindle temporarily to the head to prevent rotary movement of the spindle, indexing means between the head and spindle for use when the mechanism is used as a dividing head, means for securing the indexing means in an inoperative position to permit free rotation of the spindle in the head by the manual or power means, a source of driving power carried by the head, a driving connection between the power source and the spindle for use in rotating the work carried by the spindle and means for intercepting said power driving of the spindle to permit manual rotation independent of said power source.

5. In a device of the class described, the combination of a head mounted for adjustable movement about both a vertical and a horizontal axis, a work spindle mounted in the head for rotary movement about an axis perpendicular to the horizontal axis, manually actuated means for locking the spindle at will to the head, and indexing means between the head and spindle having an operative and an inoperative position, in the operative position acting to set the rotative position of the spindle in the head, said indexing means including an index plate replaceably mounted on the spindle, a nut for securing the index plate in its rotatively adjusted position on the spindle and an index lever pivoted to the head and engaging the plate to secure the spindle against accidental rotation, and a driving pulley on the spindle for driving the same when free of restraint from both the locking means and the index means.

6. In a device of the class described, the combination of a head, a work supporting spindle mounted for rotary movement in the head, indexing means for securing the spindle in preset angular position in the head, a motor carried by the head, a driving connection between the motor and spindle, control means associated with said connection for making and breaking the driving connection between the motor and spindle and means for controlling the indexing means to secure the spindle to the head by the indexing means when the driving connection with the spindle is intercepted.

7. In a device of the class described, the combination of a bracket mounted for rotary adjustment about a vertical axis and provided with a vertically extending mounting disc, an adapter having one end rotatably adjusted on the mounting disc, means for locking the same in any position in which it may be rotated, said adapter at its other end providing a vertically extending mounting disc corresponding in function to and paralleling the bracket mounting disc, a head having an attaching base adapted to fit either mounting discs, means for securing the head attaching base selectively to either mounting disc and a work supporting spindle rotatably mounted in the head.

8. In a device of the class described, the combination of a bracket provided with an upstanding mounting disc, a readily replaceable adapter including two disc-like ends disposed in parallel planes, means for mounting one of said adapter ends in rotatably adjusted position on the mounting disc in position to permit the other disc-like end to project from the bracket, a head spaced from the bracket by the adapter, means for mounting the head selectively either in rotatably adjusted position on the other end of the adapter for free rotary movement for more than 360° about a horizontal axis or for mounting the head directly on said disc and a work supporting spindle rotatably mounted in the head.

9. In a device of the class described, the combination of a head mounted for adjustable rotary movement about both vertical and horizontal axes, a work supporting spindle, roller bearings for mounting the spindle in the head for free rotary movement about its own axis, means securing the spindle in the head against axial movement, said spindle being twice reduced at one end, an index plate loose on one of the reduced portions of the spindle, a nut for releasably locking the index plate to the spindle, a spindle driving pulley carried by the outermost reduced portion of the spindle and a nut at the end of the spindle releasably locking the pulley to the spindle.

10. In a device of the class described, the combination of a head mounted for adjustable rotary movement about both a vertical and horizontal axis, a work carrying spindle mounted for rotary movement in said head, power means for driving the spindle at will, an index plate normally loose on the spindle, locking means for securing the index plate to the spindle at will, an index finger pivoted at one end to the head, extending parallel to the axis of the spindle and having its free end provided with means for engaging the index plate to hold the same and thus hold the spindle from rotating and means for securing the index finger in an inoperative position clear of the index plate to permit the spindle to be power driven.

11. In a device of the class described, the combination of a head, a work supporting spindle mounted in the head for rotary movement, an index plate carried by the spindle and provided with a notch, a lever having one end pivoted to the head and provided at its free end with an index finger for engaging in the notch to secure the spindle in rotative position relative to the head, a spring acting on the lever and tending to move the finger towards the index plate and manually actuated means engaging the lever for moving the finger into an inoperative position against the resistance of said spring and a quick acting lock for securing said last named means in position for holding the index finger clear of the index plate.

12. In a device of the class described, the combination of a work supporting means, a bracket for supporting said means in adjusted position, a base on which the bracket is mounted for rotary movement about a vertical axis and means for quickly locating the bracket in a predetermined rotative position on the base, said means including a replaceable notch ring fitted in the base and provided with a plunger receiving notch, a spring pressed plunger carried by the bracket in spaced relation to its axis of rotation and adapted when the bracket is rotated into the desired position to engage in the notch, manually controlled cam means for securing the plunger in an inoperative position free of the notch ring.

13. In a device of the class described, the combination of a work supporting means, a bracket for supporting said means in adjusted position, a base on which the bracket is mounted for rotary movement about a vertical axis, and means for quickly locating the bracket in a predetermined rotative position on the base, said means including a notch ring demountably fitted in the base and provided with a plunger receiving notch, a spring pressed plunger carried by the bracket in spaced relation to its axis of rotation and adapted when the bracket is rotated into the desired position to engage in the notch and thus hold the bracket against accidental shifting from its position as defined by the location of the notch in the particular notch ring for the time being mounted in the base.

14. In a device of the class described, the combination of work supporting means, a bracket for supporting said means in adjusted position, a base on which the bracket is mounted for rotary movement over the entire 360° about a vertical axis, manually actuated means for locking the bracket to the base in any of their relatively rotative positions, said means including a lifting bar at the axis of rotation forming a pivoting pin between the bracket and base, said bar provided at its lower end with an adjustable head for engaging the underside of the base when the bar is elevated and a manually actuated control rod rotatably journalled in the base, having a camming engagement with the lifting rod to move the head into position to secure the bracket to the base in any position of the bracket on the base on manual rotation of the control rod.

15. In a device of the class described, the combination of two members being interengaging surfaces mounted for relative rotary movement about an axis, locking means for securing the members in any position in which they may be rotated, said means including a bar carried by one of the members and shiftable in the axis of rotation, a screw connecting the bar with one of the members, the head of the screw being accessible for rotation to adjust the same relative to the bar and thus compensate for wear in the engaging surfaces between the two members and a control for securing the bar to the member in which it is mounted and for shifting the bar to and from its position locking the engaging surfaces to each other.

16. In a device of the class described, the combination of two members with a base on one rotatably mounted in a circular recess in the other for rotary movement about an axis, a bar mounted in one of the members for longitudinal movement in the axis of rotation and a headed screw having a head engaging and a shank passed through the other member, said shank being in adjustably threaded engagement with the adjacent end of the bar and manually actuated means engaging the bar for shifting the same in both axial directions and acting therethrough to shift the head of the screw to and from its engagement with said other member for binding said members from relative rotation.

17. In a device of the class described, the combination with a spindle and means in which the spindle is mounted for rotary movement about an axis of rotation, of means for rotating the spindle manually about its axis, replaceable indexing means for locating the spindle accurately in a plurality of preset rotative positions, means for moving the indexing means into an inoperative position to permit a rotation of the spindle free from interference from said indexing means and power means operatively connected to the spindle to power drive the same at will.

CARL J. HERTLEIN.